US008427810B2

(12) United States Patent
Stadlbauer et al.

(10) Patent No.: US 8,427,810 B2
(45) Date of Patent: *Apr. 23, 2013

(54) ELECTRICAL INSULATION FILM

(75) Inventors: Manfred Stadlbauer, Linz (AT);
Eberhard Ernst, Unterweitersdorf (AT);
Lauri Huhtanen, Loviisa (FI); Yvo Daniels, Zonhoven (BE); Franck Jacobs, Evergem (BE)

(73) Assignee: Borealis Technology Oy, Porvoo (FI)

( * ) Notice: Subject to any disclaimer, the term of this patent is extended or adjusted under 35 U.S.C. 154(b) by 653 days.

This patent is subject to a terminal disclaimer.

(21) Appl. No.: 12/451,320

(22) PCT Filed: May 7, 2008

(86) PCT No.: PCT/EP2008/055663
§ 371 (c)(1),
(2), (4) Date: Nov. 6, 2009

(87) PCT Pub. No.: WO2008/135598
PCT Pub. Date: Nov. 13, 2008

(65) Prior Publication Data
US 2010/0134953 A1 Jun. 3, 2010

(30) Foreign Application Priority Data
May 8, 2007 (EP) .................................. 07009238

(51) Int. Cl.
C08F 10/06 (2006.01)
C08F 4/6592 (2006.01)
H01B 3/44 (2006.01)
B29C 55/12 (2006.01)

(52) U.S. Cl.
USPC ........... 361/323; 264/435; 264/479; 264/481; 428/523; 428/461; 526/160; 526/170; 526/348.1; 526/351

(58) Field of Classification Search .................. 428/523; 428/461; 526/160, 170, 348.1, 351; 361/323; 264/435, 479, 481
See application file for complete search history.

(56) References Cited

U.S. PATENT DOCUMENTS 5,468,440 A 11/1995 McAlpin et al.
7,914,899 B2 * 3/2011 Stadlbauer et al. ........... 428/500

FOREIGN PATENT DOCUMENTS

| EP | 227 300 A2 * | 7/1987 |
|---|---|---|
| EP | 0227300 | 7/1987 |
| EP | 0887379 A1 | 12/1998 |
| WO | WO9212182 A1 | 7/1992 |
| WO | WO9428034 | 12/1994 |
| WO | WO9722633 A1 | 6/1997 |
| WO | WO 00/25330 | 5/2000 |
| WO | WO0148034 A2 | 7/2001 |
| WO | WO02/16455 | 2/2002 |
| WO | WO 02/16455 A1 * | 2/2002 |
| WO | WO03/051934 | 6/2003 |
| WO | WO 2008/091831 | 7/2008 |
| WO | WO2008/135598 | 11/2008 |

OTHER PUBLICATIONS

Riichirô Chûjô and Yoshiaki Kogure (Department of Materials Engineering, The Nishi-Tokyo University, Uenohara-cho, Kitatsuru-gun, Yamanashi 409-01, Japan;—and Taito Vadnanen (Neste Oy, Technology Centre, PO Box 310, Porvoo SF-06101, Finland (Received Feb. 26, 1993; revised Apr. 30, 1993)—Two-site model analysis of 13C n.m.r. of polypropylene polymerized by Ziegler-Natta catalyst with external alkoxysilane donors, Polymer 35 (1994) 339-342.

Tetsuo Hayashi, Yoshio Inoue and Riichirô Chûjô; Department of Polymer Chemistry, Tokyo Institute of Technology, 12-1 Ookayama 2-choume, Meguroku, Tokyo 152, Japan;—and Tetsuo Asakura (Department of Polymer Engineering, Faculty of Technology, Tokyo University of Agriculture and Technology, Koganei, Tokyo 184, Japan (Received Apr. 24, 1987; revised May 25, 1987; accepted Jun. 2, 1987); Heptad configurational analysis of 13C n.m.r. spectra in highly isotactic polypropylene, Polymer 29 (1988) 138-143.

Alcazar, Ruan, Thierry, Lotz; Structural Matching Between the Polymeric Necleating Agent Istactic Poly (vinylcyclohexane) and Isotactic Polypropylene; Dec. 12, 2005; pp. A-I; Institute of Materials Science and Engineering; National Sun Yat-sen University, Kaohsiung 804, Taiwan, Republic of China.

"Methods of tests for electric strength of solid insulating materials" (Part 1: Tests at power frequencies); pages from International Standard; 1988; First Edition; typeset and printed by the IEC Central Office, Geneva, Switzerland.

* cited by examiner

Primary Examiner — Roberto Rabago
(74) Attorney, Agent, or Firm — Warn Partners, P.C.

(57) ABSTRACT

The present invention relates to a capacitor film comprising a biaxially oriented polypropylene wherein a) said polypropylene has a draw ratio in machine direction of at least 4.0 and a draw ratio in transverse direction of at least 4.0, and b) said polypropylene has an electrical breakdown strength EB63% according to IEC 60243-part 1 (1988) of at least 300 kV/mm at a draw ratio in machine direction and in transverse direction of 4.0.

23 Claims, 7 Drawing Sheets

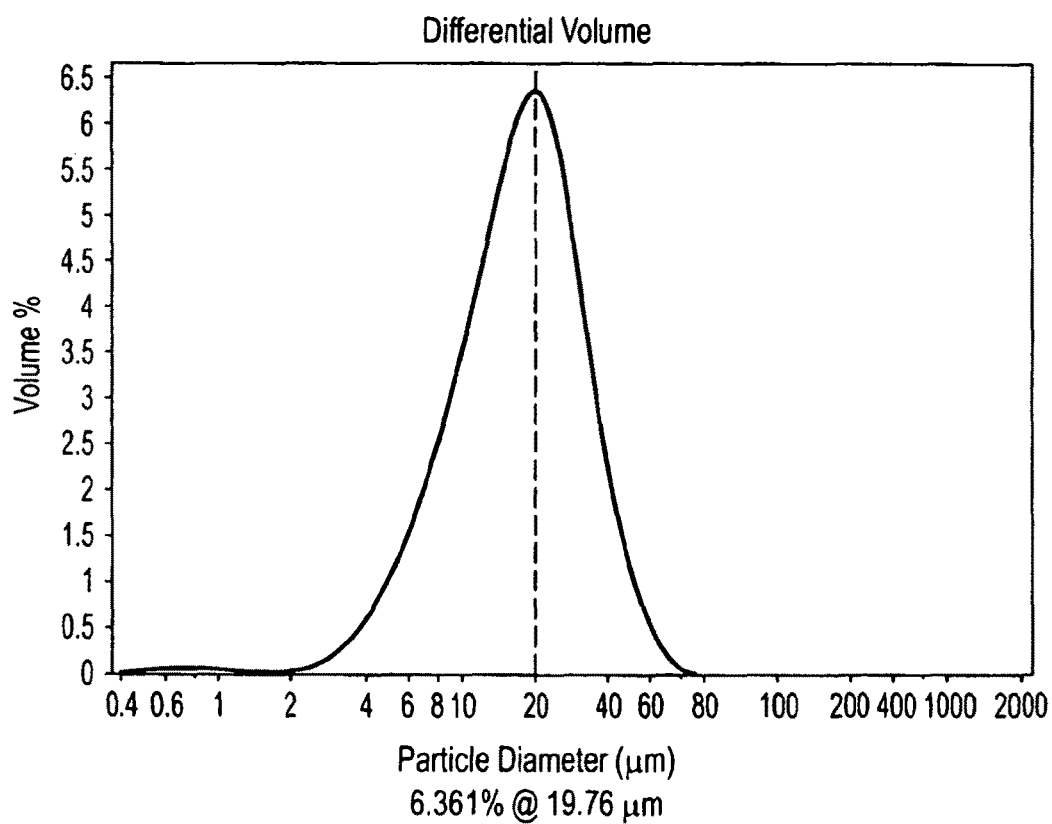
Figure 1: Catalyst particle size distribution via Coulter counter

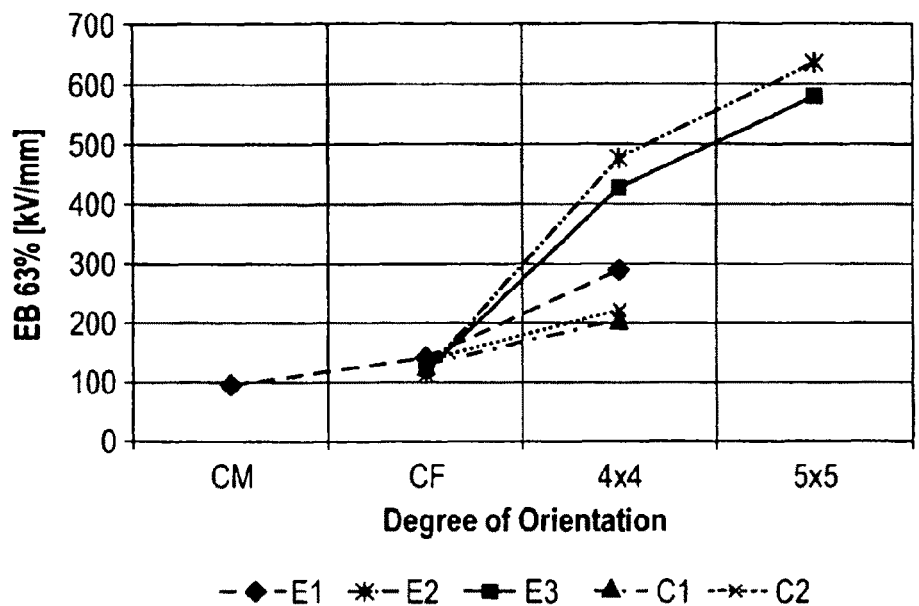
Figure 2: Electrical Breakdown Strength of Differently Oriented Specimen (CM... compression moulded, CF... cast film, 4x4... BOPP with 4 x stretching in MD and 4 x stretching in TD, 5x5... BOPP 5x5 stretching)

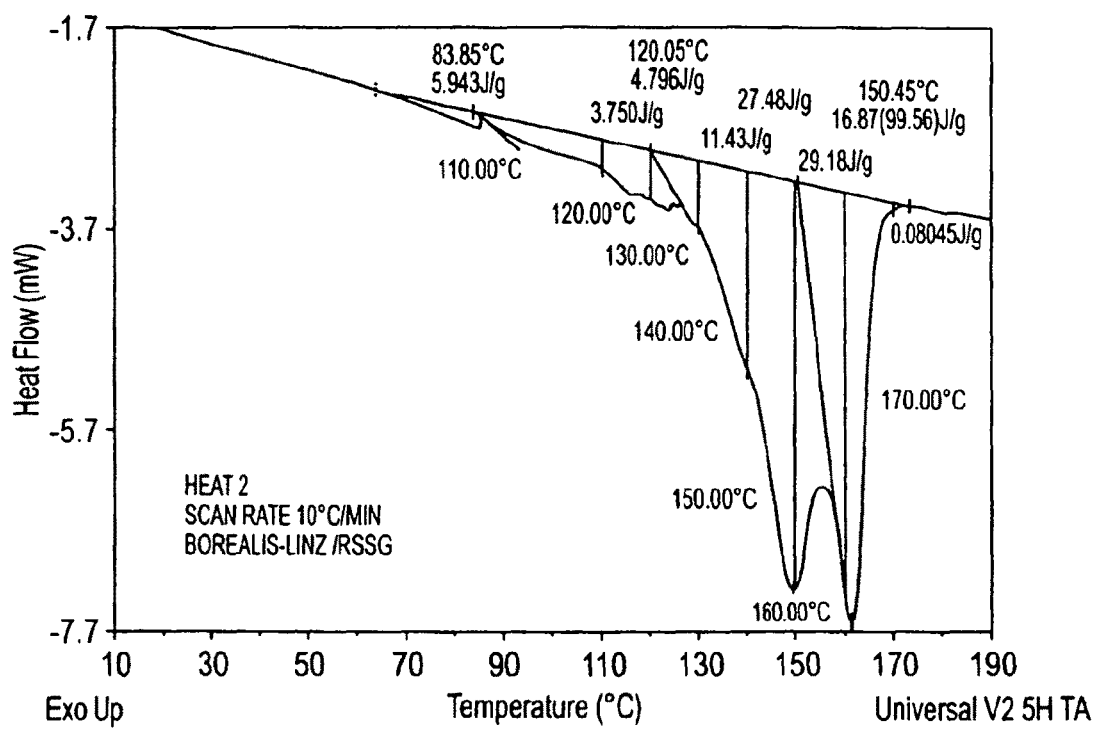
Figure 3: SIST Curve E 1 (6.76mg sample)

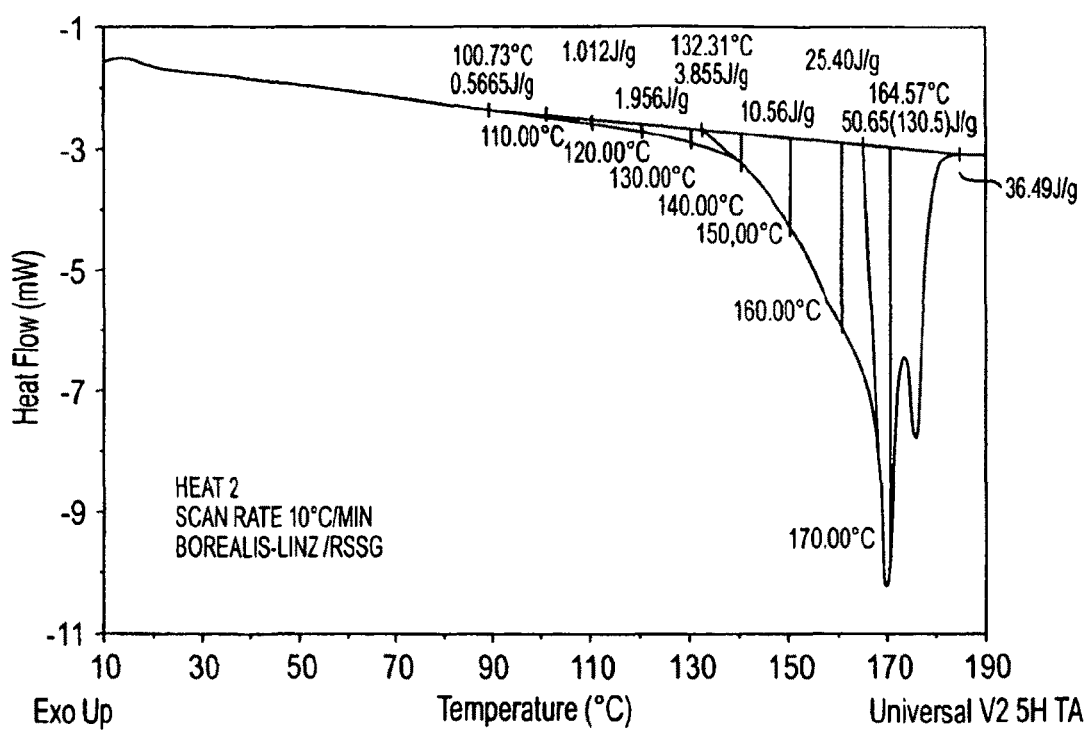
Figure 4: SIST Curve CE 1 (5.21mg sample)

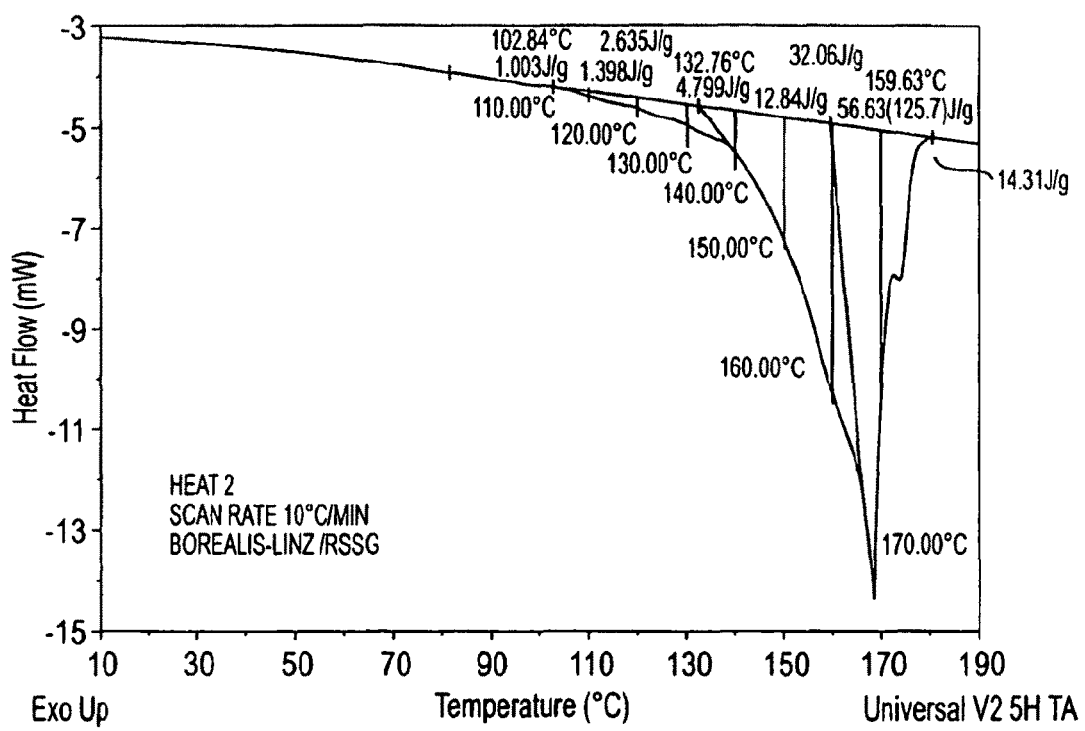
Figure 5: SIST Curve CE 2 (7.27mg sample)

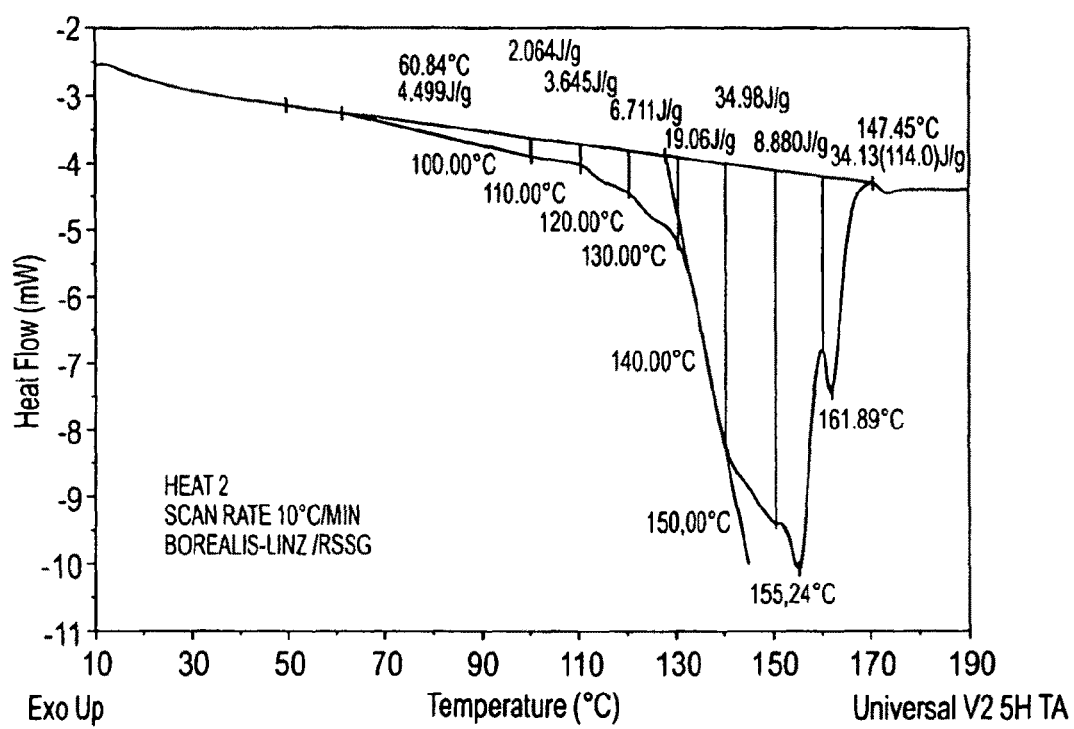
Figure 6: SIST Curve E 3 (8.27mg sample)

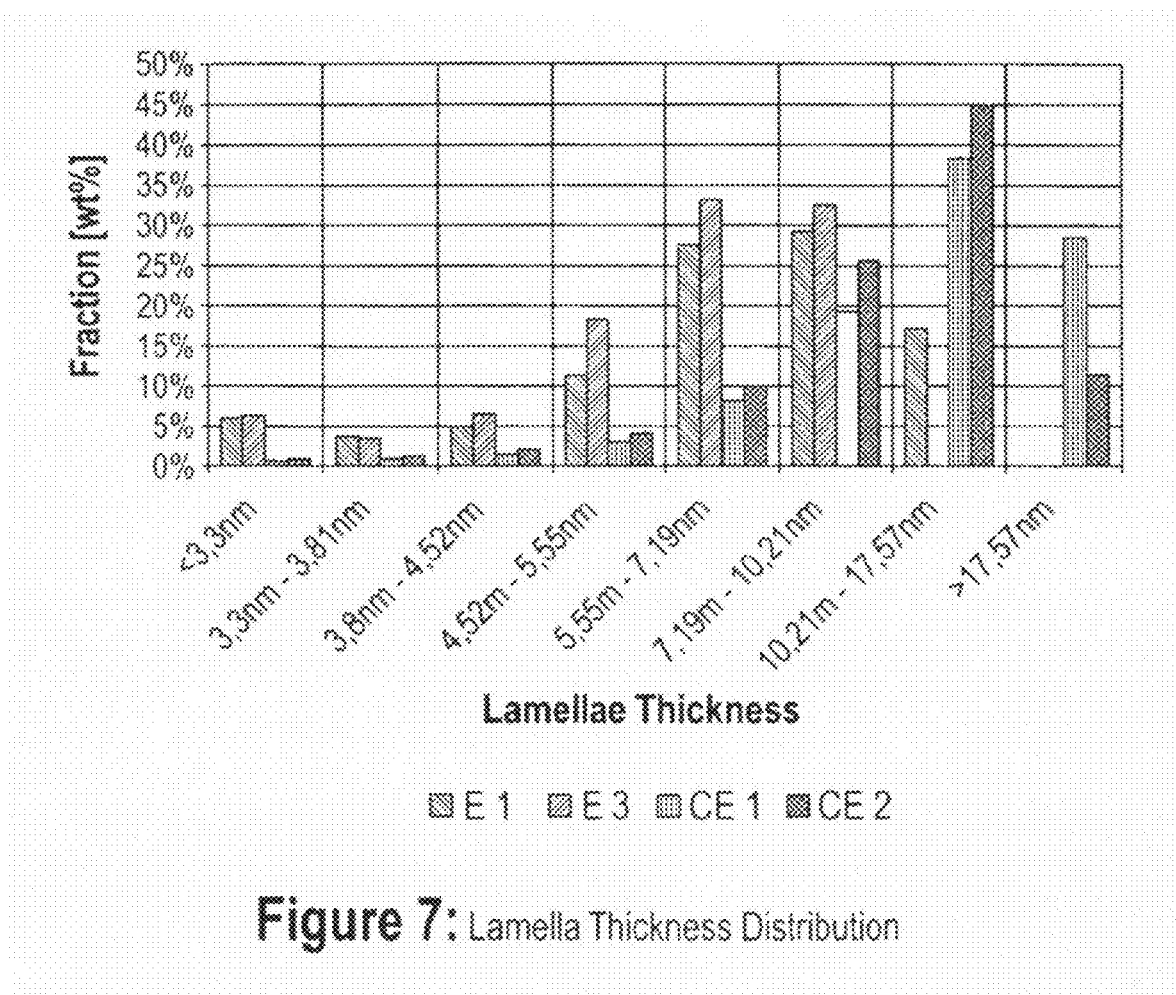
Figure 7: Lamella Thickness Distribution

ELECTRICAL INSULATION FILM

This application is a National Stage of International Application No. PCT/EP2008/055663, filed May 7, 2008. This application claims priority to European Patent Application No. 07009238.2 filed on May 8, 2007. The disclosures of the above applications are incorporated herein by reference.

The present invention relates to electrical insulation films, in particular capacitor films, and their use.

Capacitor films must withstand extreme conditions like high temperatures and high electrical breakdown strength. Additionally it is appreciated that capacitor films possess good mechanical properties like a high stiffness. Up to now there is the prevailing opinion in the technical field of capacitor technology that high electrical breakdown strength can be only achieved with a low level of electrical conduction caused by residual metals such as titanium, aluminium and boron. However traditional polypropylenes produced with a Ziegler-Nana catalyst are contaminated with high amounts of residual catalyst components. To achieve the desired very low levels of impurities to make the polypropylene suitable for capacitor films, the polypropylenes must be troublesome washed, a process which is time consuming and cost-intensive. To overcome the washing step polypropylenes produced in the presence of supported single-site catalysts have been developed, as for instance described in WO 02/16455 A1, with low levels of impurities including metallic and non-metallic impurities, like aluminium, titanium, silicon, and halogen (such as Cl and F). However to achieve this goal of low levels of impurities the process conditions must be controlled very carefully. Moreover such polypropylenes have the drawback that they cannot be processed in a stable way. In particular films based on polypropylenes produced in the presence of supported single-site catalysts suffer from sagging and break easily when manufactured.

Therefore the object of the present invention is to provide a capacitor film withstanding a high electric field strength without causing failure of the same and said film having in particular good mechanical properties, such as a high stiffness. Preferably such a capacitor film has additionally a high temperature resistance.

The present invention is based on the finding that an improved breakdown behaviour can be accomplished by using a polypropylene for the capacitor film featured by a rather high amount of thin lamellae determined by stepwise isothermal segregation technique (SIST). Such a capacitor film reaches a balance of high thermal resistance, high electrical breakdown strength and good mechanical properties. It has been in particular found out that the good properties can be achieved independently from the amount of impurities present, i.e. whether the polypropylene comprises rather high amounts of aluminium, titanium, silicon, halogen (such as Cl and F) and/or boron.

Accordingly, the object outlined above is solved by providing a capacitor film comprising a biaxially oriented polypropylene wherein
a) said polypropylene has a draw ratio in machine direction of at least 4.0 and a draw ratio in transverse direction of at least 4.0, and
b) said polypropylene and/or said capacitor film has (have) an electrical breakdown strength EB63% according to IEC 60243-part 1 (1988) of at least 300 kV/mm at a draw ratio in machine direction of 4.0 and at a draw ratio in transverse direction of 4.0.

Preferably the capacitor film is further characterized that said film and/or the polypropylene of said film has/have xylene solubles of some extent, i.e. of at least 0.50 wt.-%.

Moreover it is preferred, that the biaxially oriented polypropylene as defined in the instant invention is the only polymer component of the capacitor film.

Such capacitor films have superior properties compared to the films known in the art. Especially, the inventive capacitor films have high values of electrical breakdown strength also in case relatively high amounts of impurities are present in the film. Thus no troublesome washing steps are necessary as with polypropylenes known in the art. Moreover the capacitor films according to this invention have in addition a high temperature resistance and are obtainable at high process stability and low process temperature. Moreover and surprisingly the inventive film has in addition good mechanical properties at a high stiffness expressed in tensile modulus. Additionally it has been observed that the new capacitor films according to this invention show a significant increase of electrical breakdown strength with increasing the draw ratio.

BRIEF DESCRIPTION OF THE SEVERAL VIEWS OF THE DRAWINGS

The present invention will become more fully understood from the detailed description and the accompanying drawings, wherein:

FIG. 1 shows a diagram of the catalyst particle size distribution determined via Coulter counter.

FIG. 2 shows a diagram of the electrical breakdown strength of different oriented specimen.

FIG. 3 shows a diagram of the SIST curve of E1.

FIG. 4 shows a diagram of SIST curve of CE1.

FIG. 5 shows a diagram of the SIST curve of CE2.

FIG. 6 shows a diagram of the SIST curve of E3.

FIG. 7 shows a diagram of the lamella thickness distribution of E1, E3, CE1 and CE2.

A first requirement of the present invention is that the polypropylene of the capacitor film is biaxially oriented, i.e. has a draw ratio in machine direction of at least 4.0 and a draw ratio in transverse direction of at least 4.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably the draw ratio in machine direction of the biaxially oriented polypropylene ranges from 4.0 to 8.0, more preferably from 4.5 to 6.5. The draw ratio in transverse direction of the biaxially polypropylene ranges preferably from 6.0 to 10.0, more preferably from 7.0 to 9.5. In a preferred embodiment the biaxially polypropylene has a draw ratio in machine direction from 4.5 to 7.0. in particular from 4.5 to 5.0, and a draw ratio in transverse direction from 6.0 to 10.0, in particular from 8.0 to 10.

To obtain such a biaxially polypropylene preferably a process is applied as described below in the instant invention.

The second requirement of the present invention is, that the biaxially polypropylene and/or said capacitor film has (have) a rather high electrical breakdown strength EB63%, i.e. an electrical breakdown strength EB63% according to IEC 60243-part 1 (1988) of at least 300 kV/mm, at a draw ratio in machine direction and in transverse direction of 4.0. More preferably the electrical breakdown strength EB63% of the biaxially polypropylene and/or said capacitor film at a draw ratio in machine direction and in transverse direction of 4.0 is (are) at least 350 kV/mm, still more preferably at least 400 kV/mm and yet more preferably at least 430 kV/mm. Further details about the measurement of the electrical breakdown strength are provided below in the examples.

As stated above, the biaxiallly polypropylene is in particular characterized in that the electrical breakdown strength EB63% of the biaxially oriented polypropylene disproportionately increases with increase of the stretching ratio, as can be seen in FIG. 2. Thus it is preferred that the electrical breakdown strength EB63% of the biaxially oriented polypropylene and/or of the capacitor film at a draw ratio in machine direction and in transverse direction of 5.0 is (are) at least 500 kV/mm, still more preferably at least 550 kV/mm and yet more preferably at least 580 kV/mm.

Moreover it is preferred that the capacitor film and/or the polypropylene of said capacitor film has/have xylene solubles of some extent, i.e. of at least 0.50 wt.-%. Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

Preferably, the polypropylene component of the film has xylene solubles of more than 0.60 wt.-%. On the other hand, the amount of xylene solubles should not be too high since they represent a potential contamination risk. Accordingly it is preferred that the xylene solubles are not more than 1.00 wt.-% and still more preferably not more than 0.90 wt.-%. In preferred embodiments the xylene solubles are in the range of 0.60 to 1.00 wt.-% and more preferably in the range of 0.60 to 0.90 wt.-%.

Preferably, the capacitor film has xylene solubles of more than 0.60 wt.-%. Even more preferred, the capacitor film has xylene solubles of not more than 1.00 wt.-% and more preferably of not more than 0.90 wt.-%. In particular, the film has xylene solubles in the range of 0.60 wt.-% to 1.00 wt. % and more preferably of 0.60 wt.-% to 0.90 wt.-%.

Moreover it is preferred that the capacitor film according to this invention is further specified by its lamellar thickness distribution (see FIG. 7). It has been recognized that higher electrical breakdown strength is achievable in case the polymer comprises rather high amounts of thin lamellae. Thus the acceptance of the film as a capacitor film is independent from the amounts of impurities present in the polypropylene but from its crystalline properties. The stepwise isothermal segregation technique (SIST) provides a possibility to determine the lamellar thickness distribution. The exact method is defined in the example section. In the instant invention under lamellar thickness is understood the lamellar thickness of the polymer measured according to the stepwise isothermal segregation technique (SIST) method as defined in the example section. Rather high amounts of polymer fractions crystallizing at lower temperatures indicate a rather high amount of thin lamellae.

Thus the inventive capacitor film and/or the polypropylene of the film is (are) characterized by a rather high amount of thin lamellae; i.e. a rather high amount of lamellae having a thickness of $\leq 7.19$ nm.

Accordingly it is preferred that the inventive capacitor film and/or the polypropylene of the film comprise(s) at least 20 wt.-%, more preferred at least 30 wt.-%, yet more preferred at least 35 wt.-%, still more preferred at least 40 wt.-%, still yet more preferred at least 45 wt.-% and most preferred at least 50 wt.-%, of a fraction of lamellae with a thickness of $\leq 7.19$ nm.

More precisely and preferably the inventive capacitor film and/or the polypropylene of the film comprise(s) at least 12 wt.-%, more preferably at least 20 wt.-%, yet more preferably of at least 25 wt.-%, of a fraction of lamellae in the range of 5.55 nm to 7.19 nm. Furthermore it is preferred that the inventive capacitor film and/or the polypropylene of the film comprise(s) at least 5 wt.-%, more preferably at least 7 wt.-%, yet more preferably of at least 10 wt.-%, of a fraction of lamellae in the range of 4.52 nm to 5.55 nm.

Thus it is preferred that the inventive capacitor film and/or the polypropylene of the film
(a) comprise(s) at least 20 wt.-%, more preferred at least 30 wt.-%, yet more preferred at least 35 wt.-%, still more preferred at least 40 wt.-%, still yet more preferred at least 45 wt.-% and most preferred at least 50 wt.-%, of a fraction of lamellae with a thickness of $\leq 7.19$ nm, wherein
(b) said fraction of lamellae with a thickness of $\leq 7.19$ nm comprises at least 12 wt.-%, more preferably at least 20 wt.-%, yet more preferably of at least 25 wt.-%, of a fraction of lamellae in the range of 5.55 nm to 7.19 nm and/or
(c) at least 5 wt.-%, more preferably at least 7 wt.-%, yet more preferably of at least 10 wt.-%, of a fraction of lamellae in the range of 4.52 nm to 5.55 nm The method for determining the lamellar thickness distribution is described in detail in the example section. The weight percentages are based on the total amount of capacitor film and/or the polypropylene measured by SIST.

The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

It is preferred that the capacitor film of the present invention comprises a polypropylene which has a weight average molecular weight ($M_w$) from 10,000 to 2,000,000 g/mol, more preferably from 20,000 to 1,500,000 g/mol.

The number average molecular weight ($M_n$) of the polypropylene is preferably in the range of 5,000 to 750,000 g/mol, more preferably from 10,000 to 750,000 g/mol.

As a broad molecular weight distribution (MWD) improves the processability of the polypropylene the molecular weight distribution (MWD) is preferably up to 20.00, more preferably up to 10.00, still more preferably up to 8.00. However a rather broad molecular weight distribution stimulates sagging. Therefore, in an alternative embodiment the molecular weight distribution (MWD) is preferably between 1.00 to 8.00, still more preferably in the range of 1.00 to 4.00, yet more preferably in the range of 1.00 to 3.50.

Furthermore, it is preferred that the polypropylene component of the film of the present invention has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$. Accordingly, it is preferred that in the present invention the capacitor film comprises a polypropylene which has an $MFR_2$ up to 10.00 g/10 min, more preferably up to 6.00 g/10 min. In another preferred embodiment the polypropylene has $MFR_2$ up to 4 g/10 min. A preferred range for the $MFR_2$ is 1.00 to 10.00 g/10 min, more preferably in the range of 1.00 to 8.00 g/10 min, yet more preferably in the range of 1.00 to 6.00 g/10 min.

As cross-linking has a detrimental effect on the extensional flow properties it is preferred that the polypropylene according to this invention is non-cross-linked.

More preferably, the polypropylene of the film according to this invention shall have a rather high isotacticity measured by meso pentad concentration (also referred herein as pentad concentration), i.e. higher than 91%, more preferably higher than 93%, still more preferably higher than 94% and most preferably higher than 95%. On the other hand pentad concentration shall be not higher than 99.5%. The pentad concentration is an indicator for the narrowness in the regularity distribution of the polypropylene and measured by NMR-spectroscopy.

In addition, it is preferred that the polypropylene of the capacitor film has a melting temperature Tm of higher than 148° C., more preferred higher than 150° C. In a preferred embodiment, melting temperature Tm of the polypropylene component is higher than 148° C. but below 156° C. The measuring method for the melting temperature Tm is discussed in the example section.

The melting temperature Tm of the capacitor film is preferably at least 148° C., more preferably at least 150° C. In a preferred embodiment, the melting temperature Tm of the capacitor film is higher than 150° C. but below 160° C.

Furthermore a rather high tensile modulus at a draw ratio of 4 in machine direction and a draw ratio of 4 in transverse direction is appreciated since biaxially oriented polypropylene films commercially are stretched with a draw ratio of 4 to 8, more preferably 4 to 6, in machine direction and with a draw ratio of 5 to 10, more preferably of 6 to 8, in transverse direction.

Thus the polypropylene component of the film of the present invention has a tensile modulus of at least 800 MPa, measured according to ISO 527-3 at a cross head speed of 1 mm/min (with thickness of 100 µm). More preferably, the polypropylene component has a tensile modulus of at least 850 MPa, even more preferably 900 MPa, and yet more preferably at least 1000 MPa.

Preferably, the biaxially oriented polypropylene film of the present invention has a tensile modulus of at least 1800 MPa at a draw ratio of 4.0 in machine direction and in transverse direction, wherein the tensile modulus is measured according to ISO 527-3 at a cross head speed of 1 mm/min (exact measuring method is provided in the example section). More preferably, the polypropylene film has a tensile modulus of at least 1900 MPa, even more preferably 1950 MPa, and most preferably at least 2200 MPa at a draw ratio of 4.0 in machine direction and in transverse direction.

In a preferred embodiment, the film has a stretching stress of at least 2.5 MPa in machine direction and at least 2.5 MPa in transverse direction at a stretching temperature of 152° C. or less and a draw ratio of 4 in machine direction and in transverse direction. Preferably, the stretching temperature mentioned above is at least 2° C., more preferably at least 3° C. below the melting temperature of the film.

In addition it is appreciated that the inventive capacitor film has good optical properties. Thus it is preferred that capacitor film has a haze of not more than 15, still more preferred not more than 10 measured according to ASTM D 1003-92 (exact measuring method is provided in the example section). In turn the transparency of the film shall be rather high. Thus it is preferred that the capacitor film has a transparency of at least 90% measured according to ASTM D 1003-92.

Preferably the polypropylene of the film according to this invention has low levels of impurities, i.e. low levels of aluminium (Al) residue and/or low levels of silicon residue (Si) and/or low levels of boron (B) residue. Accordingly the aluminium residues of the polypropylene can be lowered to a level of 12.00 ppm. Thus the aluminium residue content of the polypropylene of the film according to this invention is preferably below 20 ppm, more preferably below 18 ppm and yet more preferably 15 ppm. Preferred ranges of aluminium residues are 12 to 20 ppm, more preferred 12 to 18 ppm and yet more preferred 12 to 15 ppm. As stated above the polypropylene of the film according to this invention may comprise low values of silicon residue (Si) and/or boron (B) residue, i.e. below 40 ppm, more preferably below 20 ppm, yet more preferably below 10 ppm. Hence in one preferred embodiment the film according to this invention comprises a polypropylene which is preferably essentially free of any boron and/or silicon residues, i.e. residues thereof are not detectable (The analysis of residue contents is defined in the example section). Further it is preferred that the polypropylene of the film according to this invention is free of titanium and/or magnesium residues. In other words the polypropylene according to this invention has been preferably not produced with a catalyst system comprising titanium and/or magnesium. On the other hand the properties of this invention are not detrimentally influenced by the presence of residues. In another preferred embodiment the polypropylene of the film according to this invention comprises boron and/or silicon in detectable amounts, i.e. in amounts of more than 0.10 ppm of boron residues and/or silicon residues, still more preferably in amounts of more than 0.20 ppm of boron residues and/or silicon residues, yet more preferably in amounts of more than 0.50 ppm of boron residues and/or silicon residues. In still another preferred embodiment the polypropylene component of the film according to this invention comprises Al residues in an amount of more than 12.00 ppm, even more preferred in an amount of more than 20.00 ppm, yet more preferred in an amount of more than 25.00 ppm. In yet another preferred embodiment the polypropylene component of the film according to this invention comprises boron and/or silicon in detectable amounts, i.e. in amounts of more than 0.20 ppm of boron residues and/or silicon residues, and aluminium residues in an amount of more than 12.00 ppm, even more preferred in an amount of more than 20.00 ppm and yet more preferred in an amount of more than 25.00 ppm.

Moreover preferably the capacitor film according to this invention has low levels of impurities, i.e. low levels of aluminium (Al) residue and/or low levels of silicon residue (Si) and/or low levels of boron (B) residue. Accordingly the aluminium residues of the film can be lowered to a level of 12.00 ppm. Thus the aluminium residue content of the film according to this invention is preferably below 20 ppm, more preferably below 18 ppm and yet more preferably 15 ppm. Preferred ranges of aluminium residues are 12 to 20 ppm, more preferred 12 to 18 ppm and yet more preferred 12 to 15 ppm. As stated above the film according to this invention may comprise low values of silicon residue (Si) and/or boron (B) residue, i.e. below 40 ppm, more preferably below 20 ppm, yet more preferably below 10 ppm. Hence in one preferred embodiment the film according to this invention is preferably essentially free of any boron and/or silicon residues, i.e. residues thereof are not detectable (The analysis of residue contents is defined in the example section).

Further it is preferred that the film according to this invention is free of titanium and/or magnesium residues. In other words the polypropylene according to this invention has been preferably not produced with a catalyst system comprising titanium and/or magnesium. On the other hand the properties of this invention are not detrimentally influenced by the presence of residues. Hence in one preferred embodiment the film according to this invention is preferably essentially free of any boron and/or silicon residues, i.e. residues thereof are not detectable (The analysis of residue contents is defined in the example section). In another preferred embodiment the film according to this invention comprises boron and/or silicon in detectable amounts, i.e. in amounts of more than 0.10 ppm of boron residues and/or silicon residues, still more preferably in amounts of more than 0.20 ppm of boron residues and/or silicon residues, yet more preferably in amounts of more than 0.50 ppm of boron residues and/or silicon residues. In still another preferred embodiment the film according to this invention comprises Al residues in an amount of more than 12.00 ppm, even more preferred in an amount of more than 20.00 ppm and yet more preferred in an amount of more than 25.00 ppm. In yet another preferred embodiment the film according to this invention comprises boron and/or silicon in detectable amounts, i.e. in amounts of more than 0.20 ppm of boron residues and/or silicon residues, and aluminium residues in an amount of more than 12.00 ppm, even more preferred in an amount of more than 20.00 ppm and yet more preferred in an amount of more than 25.00 ppm.

In a preferred embodiment the polypropylene as defined above (and further defined below) is preferably unimodal. In another preferred embodiment the polypropylene as defined above (and further defined below) is preferably multimodal, more preferably bimodal.

"Multimodal" or "multimodal distribution" describes a frequency distribution that has several relative maxima (contrary to unimodal having only one maximum). In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the polypropylene of the capacitor film is not unimodal it is preferably bimodal.

The polypropylene of the film according to this invention can be a homopolymer or a copolymer. In case the polypropylene is unimodal the polypropylene is preferably a polypropylene homopolymer. In turn in case the polypropylene is multimodal, more preferably bimodal, the polypropylene can be a polypropylene homopolymer as well as a polypropylene copolymer. However it is in particular preferred that in case the polypropylene is multimodal, more preferably bimodal, the polypropylene is a polypropylene homopolymer. Furthermore it is preferred that at least one of the fractions of the multimodal polypropylene is a polypropylene according to this invention, more preferably a polypropylene homopolymer according to the instant invention.

The polypropylene of the capacitor film according to this invention is most preferably a unimodal polypropylene homopolymer.

The expression polypropylene homopolymer as used in this invention relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be measured with FT infrared spectroscopy. Further details are provided below in the examples.

Further it is preferred that the polypropylene of the instant invention is free of units derived from 3-branched α-olefins having 6 or more carbon atoms and/or vinylcycloalkanes having 6 or more carbon atoms. Even more preferred the inventive film comprises a propylene homopolymer, i.e. free of units derived from 3-branched α-olefins having 6 or more carbon atoms and/or vinylcycloalkanes having 6 or more carbon atoms. In case a propylene copolymer is used, than it is preferred that the copolymer is free of units derived from 3-branched α-olefins having 6 or more carbon atoms and/or vinylcycloalkanes having 6 or more carbon atoms.

In case the polypropylene of the film according to this invention is a multimodal or bimodal polypropylene copolymer, it is preferred that the comonomer is ethylene. However, also other comonomers known in the art are suitable. Preferably, the total amount of comonomer, more preferably ethylene, in the propylene copolymer is up to 30 wt %, more preferably up to 25 wt %.

In a preferred embodiment, the multimodal or bimodal polypropylene copolymer is a polypropylene copolymer comprising a polypropylene homopolymer matrix being a polypropylene as defined above and an ethylene-propylene rubber (EPR).

The polypropylene homopolymer matrix can be unimodal or multimodal, i.e. bimodal. However it is preferred that polypropylene homopolymer matrix is unimodal.

Preferably, the ethylene-propylene rubber (EPR) in the total multimodal or bimodal polypropylene copolymer is up to 50 wt %. More preferably the amount of ethylene-propylene rubber (EPR) in the total multimodal or bimodal polypropylene copolymer is in the range of 10 to 40 wt %, still more preferably in the range of 10 to 30 wt %.

In addition, it is preferred that the multimodal or bimodal polypropylene copolymer comprises a polypropylene homopolymer matrix being a polypropylene as defined above and an ethylene-propylene rubber (EPR) with an ethylene-content of up to 50 wt %.

In addition, it is preferred that the polypropylene as defined above is produced in the presence of the catalyst as defined below. Furthermore, for the production of the polypropylene as defined above, the process as stated below is preferably used.

Moreover from the above defined and further defined capacitor films are preferably the following two embodiments disclaimed:

(A) A capacitor film comprising a biaxially oriented polypropylene
    a) said polypropylene has a draw ratio in machine direction and transverse direction of 4, and
    b) said polypropylene and/or said capacitor film has (have) an electrical breakdown strength EB63% according to IEC 60243-part 1 (1988) of 291 or 388 kV/mm at a draw ratio in machine direction and in transverse direction of 4.

(B) A capacitor film comprising a biaxially oriented polypropylene
  a) said polypropylene has a draw ratio in machine direction and transverse direction of 5, and
  b) said polypropylene and/or said capacitor film has (have) an electrical breakdown strength EB63% according to IEC 60243-part 1 (1988) of 638 kV/mm at a draw ratio in machine direction and in transverse direction of 5.

The polypropylene of the capacitor film according to this invention has been in particular obtained by a new catalyst system. This new catalyst system comprises a symmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

A symmetric catalyst according to this invention is a metallocene compound having a $C_2$-symetry. Preferably the $C_2$-symetric metallocene comprises two identical organic ligands, still more preferably comprises only two organic ligands which are identical, yet more preferably comprises only two organic ligands which are identical and linked via a bridge.

It is preferred that the rac:meso ratio of the metallocene compound of the instant invention is at least 20:1, i.e. 95% rac.

Said symmetric catalyst is preferably a single site catalyst (SSC).

Due to the use of the catalyst system with a very low porosity comprising a symmetric catalyst the manufacture of the above defined short-chain branched polypropylene is possible.

Furthermore it is preferred, that the catalyst system has a surface area of lower than 25 $m^2/g$, yet more preferred lower than 20 $m^2/g$, still more preferred lower than 15 $m^2/g$, yet still lower than 10 $m^2/g$ and most preferred lower than 5 $m^2/g$. The surface area according to this invention is measured according to ISO 9277 ($N_2$).

It is in particular preferred that the catalytic system according to this invention comprises a symmetric catalyst, i.e. a catalyst as defined above and in further detail below, and has porosity not detectable when applying the method according to DIN 66135 ($N_2$) and has a surface area measured according to ISO 9277 ($N_2$) of less than 5 $m^2/g$.

Preferably the symmetric catalyst compound, i.e. the $C_2$-symetric metallocene, has the formula (I):

$$(Cp)_2R_1MX_2 \quad (I)$$

wherein
M is Zr, Hf or Ti, more preferably Zr, and
X is independently a monovalent anionic ligand, such as σ-ligand
R is a bridging group linking the two Cp ligands
Cp is an organic ligand selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
with the proviso that both Cp-ligands are selected from the above stated group and both Cp-ligands are chemically the same, i.e. are identical.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the symmetric catalyst is of formula (I) indicated above,
wherein
M is Zr and
each X is Cl.

Preferably both identical Cp-ligands are substituted.

The optional one or more substituent(s) bonded to cyclopentadienyl, indenyl, tetrahydroindenyl, or fluorenyl may be selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both identical Cp-ligands are indenyl moieties wherein each indenyl moiety bear one or two substituents as defined above. More preferably each of the identical Cp-ligands is an indenyl moiety bearing two substituents as defined above, with the proviso that the substituents are chosen in such are manner that both Cp-ligands are of the same chemical structure, i.e both Cp-ligands have the same substituents bonded to chemically the same indenyl moiety.

Still more preferably both identical Cp's are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp are of the same chemical structure, i.e both Cp-ligands have the same substituents bonded to chemically the same indenyl moiety.

Still more preferred both identical Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with proviso that the indenyl moieties of both Cp are of the same chemical structure, i.e both Cp-ligands have the same substituents bonded to chemically the same indenyl moiety.

Yet more preferably both identical Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp's are of the same chemical structure, i.e both Cp-ligands have the same substituents bonded to chemically the same indenyl moiety.

Concerning the moiety "R" it is preferred that "R" has the formula (II)

$$-Y(R')_2-\quad (II)$$

wherein
Y is C, Si or Ge, and
R' is $C_1$ to $C_{20}$ alkyl, $C_6$-$C_{12}$ aryl, or $C_7$-$C_{12}$ arylalkyl or trimethylsilyl.

In case both Cp-ligands of the symmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is $-Si(R')_2-$, wherein R' is selected independently from one or more of e.g. trimethylsilyl, $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge $-Si(R')_2-$ is preferably e.g. $-Si(C_1$-$C_6$ alkyl$)_2$-, $-Si(phenyl)_2$- or $-Si(C_1$-$C_6$ alkyl)(phenyl)-, such as $-Si(Me)_2-$.

In a preferred embodiment the symmetric catalyst, i.e. the $C_2$-symetric metallocene, is defined by the formula (III)

$$(Cp)_2R_1ZrCl_2 \quad (III)$$

wherein
both Cp coordinate to M and are selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
with the proviso that both Cp-ligands are chemically the same, i.e. are identical, and
R is a bridging group linking two ligands L,
wherein R is defined by the formula (II)

$$-Y(R')_2-\quad (II)$$

wherein
Y is C, Si or Ge, and
R' is $C_1$ to $C_{20}$ alkyl, $C_6$-$C_{12}$ aryl, or $C_7$-$C_{12}$ arylalkyl.

More preferably the symmetric catalyst is defined by the formula (III), wherein both Cp are selected from the group consisting of substituted cyclopentadienyl, substituted indenyl, substituted tetrahydroindenyl, and substituted fluorenyl.

In a preferred embodiment the symmetric catalyst is dimethylsilandiylbis(2-methyl-4-phenyl-indenyl)zirkonium dichloride. More preferred said symmetric catalyst is non-silica supported.

The above described symmetric catalyst components are prepared according to the methods described in WO 01/48034.

It is in particular preferred that the symmetric catalyst is obtainable by the emulsion solidification technology as described in WO 03/051934. This document is herewith included in its entirety by reference. Hence the symmetric catalyst is preferably in the form of solid catalyst particles, obtainable by a process comprising the steps of
a) preparing a solution of one or more symmetric catalyst components;
b) dispersing said solution in a solvent immiscible therewith to form an emulsion in which said one or more catalyst components are present in the droplets of the dispersed phase,
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2$/g, still more preferably less than 20 $m^2$/g, yet more preferably less than 15 $m^2$/g, yet still more preferably less than 10 $m^2$/g and most preferably less than 5 $m^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

The above described symmetric catalyst components are prepared according to the methods described in WO 01/48034.

As mentioned above the catalyst system may further comprise an activator as a cocatalyst, as described in WO 03/051934, which is enclosed herein with reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present invention is related to the use of the above-defined catalyst system for the production of a polypropylene according to this invention.

In addition, the present invention is related to the process for producing the inventive capacitor film comprising the polypropylene, whereby the catalyst system as defined above is employed. Furthermore it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to this invention is produced preferably in a multi-stage process in a multi-stage reaction sequence as described in WO 92/12182. The contents of this document are included herein by reference.

It has previously been known to produce multimodal, in particular bimodal, polypropylene in two or more reactors connected in series, i.e. in different steps (a) and (b).

According to the present invention, the main polymerization stages are preferably carried out as a combination of a bulk polymerization/gas phase polymerization.

The bulk polymerizations are preferably performed in a so-called loop reactor.

In order to produce the multimodal polypropylene according to this invention, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a).

If desired, a further elastomeric comonomer component, so called ethylene-propylene rubber (EPR) component as in this invention, may be incorporated into the obtained polypropylene homopolymer matrix to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:
- the temperature is within the range of 40° C. to 110° C., preferably between 60° C. and 100° C., 70 to 90° C.,
- the pressure is within the range of 20 bar to 80 bar, preferably between 30 bar to 60 bar,
- hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The process of the invention or any embodiments thereof above enable highly feasible means for producing and further tailoring the propylene polymer composition within the invention, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made polypropylene as defined above.

The capacitor film can be prepared by conventional drawing processes known in the art. Accordingly the process for the manufacture of a capacitor film according to this invention comprises the use of the polypropylene as defined herein and its forming into a film preferably by the tenter method known in the art.

The tenter method is in particular a method in which the polypropylene as defined herein is melt extruded from a slit die such as a T-die and cooled on a cooling drum obtaining an undrawn sheet. Said sheet is pre-heated for example with a heated metal roll and then drawn in the length direction between a plurality of rolls over which a difference in peripheral speeds is established and then both edges are gripped with grippers and the sheet is drawn in the transverse direction in an oven by means of a tenter resulting in a biaxially drawn film. The temperature of said stretched sheet during the longitudinal drawing is preferably controlled in such a way as to be within the temperature range of the melting point of the polypropylene as defined herein (−15 or +5° C.). The uniformity of the film thickness on transverse drawing can be evaluated with the method in which a fixed region on the film is masked after drawing in the length direction and measuring the actual drawing factor by measuring the spacing of the said masking after transverse drawing.

Subsequently, the film can treated by corona discharge in air, nitrogen, carbon dioxide gas or any of the mixtures on the surface to be metallized, to improve the adhesive strength to the metal to be deposited, and wound by a winder.

The obtained film can set in a vacuum metallizer, and the film is preferably coated with an oil to form an insulation groove suitable for the purpose concerned, using a gravure coater, etc. Then, the metal suitable for the purpose concerned is deposited to achieve a predetermined layer resistance. Furthermore, as required, metallization is carried out through a comb-shaped deposition preventive plate to continuously change the resistance value in the transverse direction of the film. The metallized film is slit, to make two metallized reels as a pair for making a capacitor device. Then, the reels are wound to form a device and the device is formed to be flat by a thermal press, being followed by metal spraying at the ends, attaching of leads, as required impregnation with an insulating oil, and packaging to make a capacitor. Moreover the present invention is directed to the use of the capacitor film as defined herein in a capacitor.

In addition, the present invention is directed to a capacitor comprising at least on layer comprising a capacitor film as defined herein. Additionally it is preferred that the capacitor comprises a metal layer, in particular a metal layer obtained by the above described process. The present invention will now be described in further detail by the following examples.

EXAMPLES

1. Definitions/Measuring Methods

The following definitions of terms and determination methods apply for the above general description of the invention as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Elementary Analysis

The below described elementary analysis is used for determining the content of elementary residues which are mainly originating from the catalyst, especially the Al-, B-, and Si- residues in the polymer. Said Al-, B- and Si-residues can be in any form, e.g. in elementary or ionic form, which can be recovered and detected from polypropylene using the below described ICP-method. The method can also be used for determining the Ti-content of the polymer. It is understood that also other known methods can be used which would result in similar results.

ICP-Spectrometry (Inductively Coupled Plasma Emission) ICP-Instrument:

The instrument for determination of Al-, B- and Si-content is ICP Optima 2000 DV, PSN 620785 (supplier Perkin Elmer Instruments, Belgium) with software of the instrument.

Detection limits are 0.10 ppm (Al), 0.10 ppm (B), 0.10 ppm (Si).

The polymer sample was first ashed in a known manner, then dissolved in an appropriate acidic solvent. The dilutions of the standards for the calibration curve are dissolved in the same solvent as the sample and the concentrations chosen so that the concentration of the sample would fall within the standard calibration curve.

ppm: means parts per million by weight

Ash content: Ash content is measured according to TSO 3451-1 (1997) standard.

Calculated ash, Al- Si- and B-content:

The ash and the above listed elements, Al and/or Si and/or B can also be calculated form a polypropylene based on the polymerization activity of the catalyst as exemplified in the examples. These values would give the upper limit of the presence of said residues originating from the catalyst.

Thus the estimate catalyst residue is based on catalyst composition and polymerization productivity, catalyst residues in the polymer can be estimated according to:

$$\text{Total catalyst residues[ppm]}=1/\text{productivity}[\text{kg}_{pp}/\text{g}_{catalyst}]\times 100$$

$$\text{Al residues[ppm]}=w_{Al,catalyst}[\%]\times \text{total catalyst residues[ppm]}/100$$

$$\text{Zr residues[ppm]}=w_{Zr,catalyst}[\%]\times \text{total catalyst residues[ppm]}/100$$

(Similar calculations apply also for B, Cl and Si residues)

Chlorine Residues Content:

The content of Cl-residues is measured from samples in the known manner using X-ray fluorescence (XRF) spectrometry. The instrument was X-ray fluorescention Philips PW2400, PSN 620487, (Supplier: Philips, Belgium) software X47. Detection limit for Cl is 1 ppm.

C. Particle Size Distribution

Particle size distribution is measured via Coulter Counter LS 200 at room temperature with n-heptane as medium.

D. NMR

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

E. $M_n$, $M_w$, MWD

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

F. Xylene Solubles (XS)

The xylene solubles (XS, wt.-%): Analysis according to the known method: 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered and evaporated in nitrogen flow and the residue dried under vacuum at 90° C. until constant weight is reached.

$$XS\% = (100 \times m_1 \times v_0)/(m_0 \times v_1), \text{ wherein}$$

$m_0$=initial polymer amount (g)
$m_1$=weight of residue (g)
$v_0$=initial volume (ml)
$V_1$=volume of analyzed sample (ml)

G. Melting Temperature

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms. Also the melt- and crystallization enthalpy (Hm and Hc) were measured by the DSC method according to ISO 11357-3.

H. Melt Flow Rate

I. $MFR_2$: Measured According to ISO 1133 (230° C., 2.16 kg load).

J. Comonomer Content

Comonomer content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of —$CH_2$— absorption peak (800-650 cm$^{-1}$) was measured with Perkin Elmer FTIR 1600 spectrometer. The method was calibrated by ethylene content data measured by $^{13}$C-NMR.

K. Stiffness

Stiffness Film TD (transversal direction), Stiffness Film MD (machine direction), Elongation at break TD and Elongation at break MD: these are determined according to ISO527-3 (cross head speed: 1 mm/min). The cast film has a thickness of 100 μm, whereas the thickness of the stretched films are indicated in the tables 3 and 4.

L. Haze and Transparency:

Haze and transparency: are determined: ASTM D1003-92 (thickness 100 μm).

M. Intrinsic Viscosity

Intrinsic viscosity: is measured according to DIN ISO 1628/1, October 1999 (in Decalin at 135° C.).

N. Porosity

Porosity: is measured according to DIN 66135.

O. Surface Area

Surface area: is measured according to ISO 9277.

P. SIST

Stepwise Isothermal Segregation Technique (SIST): The isothermal crystallisation for SIST analysis was performed in a Mettler TA820 DSC on 3±0.5 mg samples at decreasing temperatures between 200° C. and 105° C.
(i) The samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down to ambient temperature, and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals as indicated for example E 1 in the table 6 to 8.

The melting curve of the material crystallised this way can be used for calculating the lamella thickness distribution according to Thomson-Gibbs equation (Eq 1.).

$$T_m = T_0 \left(1 - \frac{2\sigma}{\Delta H_0 \cdot L}\right) \quad (1)$$

where $T_0$=457K, $\Delta H_0$=184×10$^6$ J/m$^3$, σ=0,049.6 J/m$^2$ and L is the lamella thickness.

Q. Electrical Breakdown Strength (EB63%)

It follows standard IEC 60243-part 1 (1988).

The method describes a way to measure the electrical breakdown strength for insulation materials on compression moulded plaques.

DEFINITION $$Eb: E_b = \frac{U_b}{d}$$

The electrical field strength in the test sample at which breakdown occurs. In homogeneous plaques and films this corresponds to the electrical breakdown strength divided by the thickness of the plaque/film (d), unit: kV/mm.

The electrical breakdown strength is determined at 50 Hz within a high voltage cabinet using metal rods as electrodes as described in IEC60243-1 (4.1.2). The voltage is raised over the film/plaque at 2 kV/s until a breakdown occurs.

Examples

Inventive Example 1 (E 1)

Catalyst Preparation

The catalyst was prepared as described in example 5 of WO 03/051934, with the Al- and Zr-ratios as given in said example (Al/Zr=250).

Catalyst Characteristics:

Al- and Zr-content were analyzed via above mentioned method to 36.27 wt.-% Al and 0.42%-wt. Zr. The average particle diameter (analyzed via Coulter counter) is 20 μm and particle size distribution is shown in FIG. 3.

Polymerization

A 5 liter stainless steel reactor was used for propylene polymerizations. 1100 g of liquid propylene (Borealis polymerization grade) was fed to reactor. 0.2 ml triethylaluminum (100%, purchased from Crompton) was fed as a scavenger and 15 mmol hydrogen (quality 6.0, supplied by Åga) as chain transfer agent. Reactor temperature was set to 30° C. 29.1 mg catalyst were flushed into to the reactor with nitrogen overpressure. The reactor was heated up to 70° C. in a period of about 14 minutes. Polymerization was continued for 50 minutes at 70° C., then propylene was flushed out, 5 mmol hydrogen were fed and the reactor pressure was increased to 20 bars by feeding (gaseous-) propylene. Polymerization continued in gas-phase for 144 minutes, then the reactor was flashed, the polymer was dried and weighted. Polymer yield was weighted to 901 g, that equals a productivity of 31 kg$_{pp}$/g$_{catalyst}$. 1000 ppm of a commercial stabilizer Irganox B 215 (FF) (Ciba) have been added to the powder. The powder has been melt compounded with a Prism TSE16 lab kneader at 250 rpm at a temperature of 220-230° C.

Inventive Example 2 (E 2)

A catalyst as used in I1 has been used.
A 5 liter stainless steel reactor was used for propylene polymerizations. 1100 g of liquid propylene (Borealis polymerization grade) was fed to reactor. 0.5 ml triethylaluminum (100%, purchased from Crompton) was fed as a scavenger and 50 mmol hydrogen (quality 6.0, supplied by Åga) as chain transfer agent. Reactor temperature was set to 30° C. 19.9 mg catalyst were flushed into to the reactor with nitrogen overpressure. The reactor was heated up to 70° C. in a period of about 14 minutes. Polymerization was continued for 40 minutes at 70° C., then propylene was flushed out, the reactor pressure was increased to 20 bars by feeding (gaseous-) propylene. Polymerization continued in gas-phase for 273 minutes, then the reactor was flashed, the polymer was dried and weighted.
Polymer yield was weighted to 871 g, that equals a productivity of 44 $kg_{pp}/g_{catalyst}$. 1000 ppm of a commercial stabilizer Irganox B 215 (FF) (Ciba) have been added to the powder. The powder has been melt compounded with a Prism TSE lab kneader at 250 rpm at a temperature of 220-230° C.

Inventive Example 3 (E 3)

A 5 liter stainless steel reactor was used for propylene polymerizations. 1100 g of liquid propylene (Borealis polymerization grade) was fed to reactor. 0.1 ml triethylaluminum (100%, purchased from Crompton) was fed as a scavenger and 30 mmol hydrogen (quality 6.0, supplied by Åga) as chain transfer agent. Reactor temperature was set to 30° C. 21.8 mg catalyst were flushed into to the reactor with nitrogen overpressure. The reactor was heated up to 70° C. in a period of about 14 minutes. Polymerization was continued for 30 minutes at 70° C., then propylene was flushed out and subsequently, the reactor pressure was increased to 20 bars by feeding (gaseous-) propylene. Polymerization continued in gas-phase for 256 minutes, then the reactor was flashed, the polymer was dried and weighted. Polymer yield was weighted to 953 g, that equals a productivity of 43.72 $kg_{pp}/g_{catalyst}$. 1000 ppm of a commercial stabilizer Irganox B 215 (FF) (Ciba) have been added to the powder. The powder has been melt compounded with a Prism TSE16 lab kneader at 250 rpm at a temperature of 220 to 230° C.

Comparative Example 1 (CE 1)

A commercial polypropylene homopolymer of Borealis has been used.

Comparative Example 2 (CE 2)

A commercial polypropylene homopolymer of Borealis has been used.
In Tables 1, 2 and 3, the properties of samples CE 1, CE 2, E 1 and E2 are summarized.

TABLE 1

Properties of polypropylene according to the invention and comparative examples

| | Unit | CE 1 | CE 2 | E 1 | E 2 | E 3 |
|---|---|---|---|---|---|---|
| Ash | ppm | 15 | 13 | 85 | n.a. | 74 |
| rac | % | | | 98 | 98 | 98 |
| MFR | g/10' | 2.1 | 2.1 | 2 | 5.3 | 1.1 |
| Mw | g/mol | 412000 | 584000 | 453000 | 405000 | 207000 |
| Mw/Mn | — | 9.9 | 8.1 | 2.8 | 5.3 | 4.5 |
| XS | wt % | 1.2 | 3.5 | 0.85 | 0.66 | 0.70 |
| mmmm | — | | | 0.95 | 0.95 | 0.95 |
| Tm | ° C. | 162 | 162 | 150.6 | 150.8 | 150.9 |
| Hm | J/g | 107 | 100 | 99.5 | 100.1 | 98.7 |
| Tc | ° C. | 115 | 113 | 111.9 | 111.2 | 105.9 |
| Hc | J/g | 101 | 94 | 74.6 | 92.8 | 90.5 |

TABLE 2

Preparation of the cast film and characterization
Cast film with OCS equipment, thickness constant at 90-110 μm.

| | Unit | CE 1 | CE 2 | E 1 | E 2 | E 3 |
|---|---|---|---|---|---|---|
| Stiffness Film TD | MPa | 960 | 756 | 1011 | n.a. | 710 |
| Stiffness Film MD | MPa | 954 | 752 | 1059 | n.a. | 716 |
| Elongation at Break TD | % | 789 | 792 | 700 | n.a. | 601 |
| Elongation at Break MD | % | 733 | 714 | 691 | n.a. | 723 |
| Transparency | % | 94 | 94 | 94 | n.a. | 94 |
| Haze | % | 24.2 | 19.9 | 7.8 | n.a. | 3 |

TABLE 3

Preparation of BOPP film and characterization
VTT Tampere, 4 × 4 Orientation

| Code | Unit | CE 1 | CE 2 | E 1 | E 2 | E 3 |
|---|---|---|---|---|---|---|
| EB63% | kV/mm | 210 | 224 | 291 | 388 | 431 |
| 90% LOWER CONF: | kV/mm | 197 | 203 | 267 | 349 | 383 |
| 90% UPPER CONF: | kV/mm | 223 | 244 | 311 | 425 | 480 |
| BETA: | none | 10.4 | 6.9 | 8.3 | 6.5 | |
| Stress MD4 | MPa | 4.3 | 3.8 | 3.6 | 2.7 | ca. 4 |
| Stress TD4 | MPa | 3.4 | 3.1 | 3.0 | 2.5 | ca. 4 |
| Stiffness Film 4 × 4 MD | MPa | 3003 | 3138 | 2550 | 2020 | 2105 |
| Stiffness Film 4 × 4 TD | MPa | 2943 | 2691 | 2824 | 2554 | 1835 |
| Elongation at Break Film 4 × 4 MD | % | 52 | 53 | 80 | 62 | 72 |
| Elongation at Break Film 4 × 4 TD | % | 50 | 60 | 34 | 41 | 54 |

TABLE 3-continued

Preparation of BOPP film and characterization
VTT Tampere, 4 × 4 Orientation

| Code | Unit | CE 1 | CE 2 | E 1 | E 2 | E 3 |
|---|---|---|---|---|---|---|
| Tm ONSET Film 4 × 4 | °C. | 141 | 136 | 137 | n.a. | 148 |
| Tm Film (1$^{st}$ melting 4 × 4) | °C. | 156 | 158 | 154 | 157 | 158 |
| Hm Film (1$^{st}$ melting 4 × 4) | J/g | 56 | 66 | 70 | 92 | 80 |
| Tc Film 4 × 4 | °C. | 111 | 112 | 112 | 114 | 108 |
| Hc Film 4 × 4 | J/g | 80 | 78 | 77 | 90 | 96 |
| Tm Film (2$^{nd}$ melting 4 × 4) | °C. | 167 | 165 | 156 | 154 | 153 |
| Hm Film (2$^{nd}$ melting 4 × 4) | J/g | 74 | 73 | 69 | 89 | 96 |
| Film Thickness | μm | 30 | 30 | 30 | 30 | 30 |

TABLE 4

Preparation of BOPP film and characterization
VTT Tampere, 5 × 5 Orientation

| Code | Unit | E2 | E3 |
|---|---|---|---|
| EB63% | kV/mm | 638 | 582 |
| 90% LOWER CONF: | kV/mm | 563 | 579 |
| 90% UPPER CONF: | kV/mm | 707 | 585 |
| BETA: | none | | 5.6 |
| Stress MD5 | MPa | 3.5 | ca. 4 |
| Stress TD5 | MPa | 3.4 | ca. 4 |
| Stiffness Film 5 × 5 MD | MPa | 2271 | 2055 |
| Stiffness Film 5 × 5 TD | MPa | 2445 | 2464 |
| Elongation at Break Film 5 × 5 MD | % | 39 | 38 |
| Elongation at Break Film 5 × 5 TD | % | 19 | 18 |
| Tm ONSET Film 5 × 5 | °C. | n.a. | 142 |
| Tm Film (1$^{st}$ melting 5 × 5) | °C. | 152 | 154 |
| Hm Film (1$^{st}$ melting 5 × 5) | J/g | 83 | 56 |
| Tc Film 5 × 5 | °C. | 109 | 109 |
| Hc Film 5 × 5 | J/g | 95 | 95 |
| Tm Film (2$^{nd}$ melting 5 × 5) | °C. | 153 | 151 |
| Hm Film (2$^{nd}$ melting 5 × 5) | J/g | 100 | 93 |
| Film Thickness | μm | 30 | 30 |

A biaxially oriented film is prepared as follows:

In the biaxial stretching Device Bruckner Karo IV, film samples are clamped and extended in both, longitudinal and transverse direction, at constant stretching speed. The length of the sample increases during stretching in longitudinal direction and the stretch ratio in longitudinal direction calculates from the ratio of current length over original sample length. Subsequently, the sample is stretched in transverse direction where the width of the sample is increasing. Hence, the stretch ratio calculates from the current width of the sample over the original width of the sample.

In Table 5 the crystallization behaviour of samples is determined via stepwise isothermal segregation technique (SIST).

TABLE 5

Results from stepwise isothermal segregation technique (SIST) - I

| Peak ID | Range [° C.] | E 1 $H_m$ [J/g] | E 3 $H_m$ [J/g] | CE 1 $H_m$ [J/g] | CE 2 $H_m$ [J/g] |
|---|---|---|---|---|---|
| 1 | <110 | 6.0 | 6.6 | 0.6 | 1.0 |
| 2 | 110-120 | 3.8 | 3.6 | 1.0 | 1.4 |
| 3 | 120-130 | 4.8 | 6.7 | 2.0 | 2.6 |
| 4 | 130-140 | 11.4 | 19.1 | 3.9 | 4.8 |
| 5 | 140-150 | 27.5 | 35.0 | 10.6 | 12.8 |
| 6 | 150-160 | 29.2 | 34.1* | 25.4 | 32.1 |
| 7 | 160-170 | 16.9 | | 50.7 | 56.6 |
| 8 | >170 | 0.1 | | 37.5 | 14.3 |

Hm = melting enthalpy
*>150° C.

TABLE 6

Results from stepwise isothermal segregation technique (SIST) - II

| T from | T to | E 1 $H_m$ [J/g] | E 3 $H_m$ [J/g] | CE 1 $H_m$ [J/g] | CE 2 $H_m$ [J/g] |
|---|---|---|---|---|---|
| 0 | 110 | 6 | 6.6 | 0.6 | 1 |
| 110 | 120 | 3.8 | 3.6 | 1 | 1.4 |
| 120 | 130 | 4.8 | 6.7 | 2 | 2.6 |
| 130 | 140 | 11.4 | 19.1 | 3.9 | 4.8 |
| 140 | 150 | 27.5 | 35 | 10.6 | 12.8 |
| 150 | 160 | 29.2 | 34.1 | 25.4 | 32.1 |
| 160 | 170 | 16.9 | | 50.7 | 56.6 |
| 170 | | 0.1 | | 37.5 | 14.3 |
| | | 99.7 | 105.1 | 131.7 | 125.6 |

TABLE 7

Results from stepwise isothermal segregation technique (SIST) - III

| $L_{from}$ m | $L_{to}$ m | Fraction [wt %] E 1 | E 3 | CE 1 | CE 2 |
|---|---|---|---|---|---|
| 0 | 3.30E−09 | 6.0% | 6.3% | 0.5% | 0.8% |
| 3.30E−09 | 3.81E−09 | 3.8% | 3.4% | 0.8% | 1.1% |
| 3.81E−09 | 4.52E−09 | 4.8% | 6.4% | 1.5% | 2.1% |
| 4.52E−09 | 5.55E−09 | 11.4% | 18.2% | 3.0% | 3.8% |
| 5.55E−09 | 7.19E−09 | 27.6% | 33.3% | 8.0% | 10.2% |
| 7.19E−09 | 1.02E−08 | 29.3% | 32.4% | 19.3% | 25.6% |
| 1.02E−08 | 1.76E−08 | 17.0% | 0.0% | 38.5% | 45.1% |
| 1.76E−08 | | 0.1% | 0.0% | 28.5% | 11.4% |
| | | 100.0% | 100.0% | 100.0% | 100.0% |

TABLE 8

| Results from stepwise isothermal segregation technique (SIST) - IV | | | | |
|---|---|---|---|---|
| Label | E 1 | E 3 | CE 1 | CE 2 |
| <3.3 nm | 6% | 6% | 0% | 1% |
| 3.3 nm-3.81 nm | 4% | 3% | 1% | 1% |
| 3.81 nm-4.52 nm | 5% | 6% | 2% | 2% |
| 4.52 nm-5.55 nm | 11% | 18% | 3% | 4% |
| 5.55 nm-7.19 nm | 28% | 33% | 8% | 10% |
| 7.19 nm-10.21 nm | 29% | 32% | 19% | 26% |
| 10.21 nm-17.57 nm | 17% | 0% | 38% | 45% |
| >17.57 nm | 0% | 0% | 28% | 11% |

We claim:

1. Capacitor film comprising a biaxially oriented polypropylene wherein
   a) said polypropylene being of the type obtained in the presence of a metallocene catalyst and has a draw ratio in machine direction in the range of 4.0 to 8.0 and a draw ratio in transverse direction of 6.0 to 10.0, and
   b) said polypropylene and/or said capacitor film has(have) an electrical breakdown strength EB63% according to IEC 60243-part 1 (1988) of at least 300 kV/mm at a draw ratio in machine direction and in transverse direction of 4.0.

2. Capacitor film according to claim 1, wherein said polypropylene has electrical breakdown strength EB63% according to IEC 60243-part 1 (1988) of at least 500 kV/mm at a draw ratio in machine direction and in transverse direction of 5.0.

3. Capacitor film according to claim 1, wherein the film and/or the polypropylene has/have xylene solubles (XS) of at least 0.5 wt.-%.

4. Capacitor film according to claim 1, wherein the film and/or the polypropylene comprise(s) at least 20 wt.-% of a fraction of lamellae with a thickness of ≦7.19 nm.

5. Capacitor film according to claim 1, wherein the film and/or the polypropylene has/have xylene solubles in the range of 0.5 to 1.0 wt.-%.

6. Capacitor film according to claim 1, wherein the film and/or the polypropylene has/have a tensile modulus of at least 1800 MPa at a draw ratio of 4.0 in machine direction and a draw ratio of 4.0 in transverse direction, measured according to ISO 527-3 at a cross head speed of 1 mm/min.

7. Capacitor film according to claim 1, wherein the film has a stretching stress of at least 2.5 MPa in machine direction and transverse direction at a stretching temperature of 152° C. or less and a draw ratio of 4.0 in machine direction and transverse direction.

8. Capacitor film according to claim 1, wherein the film and/or the polypropylene has/have a melting point Tm of at least 148° C.

9. Capacitor film according to claim 1, wherein the polypropylene is multimodal.

10. Capacitor film according to claim 1, wherein the polypropylene is unimodal.

11. Capacitor film according to claim 1, wherein the polypropylene has molecular weight distribution (MWD) measured according to ISO 16014 of not more than 8.00.

12. Capacitor film according to claim 1, wherein the polypropylene has a melt flow rate $MFR_2$ measured according to ISO 1133 of up to 10 g/10 min.

13. Capacitor film according to claim 1, wherein the polypropylene has a mmmm pentad concentration of higher than 94% determined by NMR-spectroscopy.

14. Capacitor film according to claim 1, wherein the polypropylene is a propylene homopolymer.

15. Capacitor film according to claim 1, wherein the polypropylene has been produced in the presence of a catalytic system comprising metallocene complex, wherein the catalytic system has a porosity measured according to DIN 66135 of less than 1.40 ml/g.

16. Capacitor film according to claim 1, wherein the polypropylene has been produced in the presence of a symmetric metallocene complex.

17. A capacitor comprising, at least one layer comprising a capacitor film having a biaxially oriented polypropylene wherein a) said polypropylene being obtained in the presence of metallocene catalyst and has a draw ratio in machine direction in the range of 4.0 to 8.0 and a draw ratio in transverse direction of 6.0 to 10.0, and b) said polypropylene and/or said capacitor film has(have) an electrical breakdown strength EB63% according to IEC 60243-part 1 (1988) of at least 300 kV/mm at a draw ratio in machine direction and in transverse direction of 4.0.

18. A process for the preparation of a capacitor film comprising,
   providing a polypropylene, wherein said polypropylene being obtained in the presence of a metallocene catalyst has a draw ratio in machine direction in the range of 4.0 to 8.0 and a draw ratio in transverse direction of 6.0 to 10.0, and said polypropylene and/or said capacitor film has(have) an electrical breakdown strength EB63% according to IEC 60243-part 1 (1988) of at least 300 kV/mm at a draw ratio in machine direction and in transverse direction of 4.0; and
   forming said polypropylene into a biaxially oriented film.

19. The process according to claim 18, wherein the polypropylene is prepared using a catalyst system of low porosity, the catalyst system comprising a symmetric catalyst, wherein the catalyst system has a porosity measured according to DIN 66135 of less than 1.40 ml/g.

20. The process according to claim 19, the catalyst system being a non silica supported system.

21. The process according to claim 19, wherein the catalyst system has a porosity below the detection limit of DIN 66135.

22. The process according to claim 19, wherein the catalyst system has a surface area of less than 25 m²/g, measured according to ISO 9277.

23. The process according to claim 19, wherein the symmetric catalyst is a transition metal compound of formula (I)

$(Cp)_2R_1MX_2$             (I)

wherein

M is Zr, Hf or Ti, more preferably Zr

X is independently a monovalent anionic ligand, such as σ-ligand

R is a briding group linking the two Cp ligands

Cp is an organic ligand selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
   with the proviso that both Cp-ligands are selected from the above stated group and both Cp-ligands are chemically the same, i.e, are identical.

* * * * *

UNITED STATES PATENT AND TRADEMARK OFFICE
CERTIFICATE OF CORRECTION

PATENT NO.        : 8,427,810 B2
APPLICATION NO.   : 12/451320
DATED             : April 23, 2013
INVENTOR(S)       : Manfred Stadlbauer et al.

It is certified that error appears in the above-identified patent and that said Letters Patent is hereby corrected as shown below:

In the Specification

Column 8, Line 24, "than" should be --then--.

Column 9, Line 22, "C2-symetry" should be --C2-symmetry--.

Column 9, Line 50, "C2-symetric" should be --C2-symmetric--.

Column 10, Line 26, "are" should be --a--.

Column 13, Line 13, "i.a." should be --i.e.--.

Column 15, Line 16, "can treated" should be --can be treated--.

Column 15, Line 37, "on" should be --one--.

Column 16, Line 15, "TSO" should be --ISO--.

Column 16, Line 19, "form" should be --from--.

Column 18, Line 14, "0.049.6" should be --0049.6--.

Column 18, Line 57, delete "to".

Column 18, Line 64, "flashed" should be --flushed--.

Column 19, Line 13, delete "to".

Column 19, Line 20, "flashed" should be --flushed--.

Column 19, Line 26, "TSE" should be --TSE 16--.

Column 19, Line 36, delete "to".

Column 19, Line 42, "flashed" should be --flushed--.

In the Claims

Column 24, Line 55, Claim 23, "briding" should be --bridging--.

Signed and Sealed this
Fifth Day of November, 2013

Teresa Stanek Rea
*Deputy Director of the United States Patent and Trademark Office*